United States Patent
Dinerman et al.

(10) Patent No.: US 8,979,067 B2
(45) Date of Patent: Mar. 17, 2015

(54) VALVE INSERT FOR A VALVE CARTRIDGE, CORRESPONDING VALVE CARTRIDGE FOR A SOLENOID VALVE, SOLENOID VALVE HAVING SAID VALVE CARTRIDGE AND METHOD FOR PRODUCING A VALVE INSERT

(75) Inventors: Michael Dinerman, Heilbronn (DE); Friedrich Mueller, Immenstadt (DE); Anton Fritz, Ofterschwang (DE); Dirk Foerch, Neuenstadt/Stein (DE); Joerg Fricke-Schmidt, Charleston, SC (US); Elmar Vier, Freiberg A. N. (DE)

(73) Assignee: Robert Bosch GmbH, Stuttgart (DE)

( * ) Notice: Subject to any disclaimer, the term of this patent is extended or adjusted under 35 U.S.C. 154(b) by 183 days.

(21) Appl. No.: 13/503,723

(22) PCT Filed: Sep. 7, 2010

(86) PCT No.: PCT/EP2010/063085
§ 371 (c)(1),
(2), (4) Date: Jul. 4, 2012

(87) PCT Pub. No.: WO2011/051036
PCT Pub. Date: May 5, 2011

(65) Prior Publication Data
US 2012/0267555 A1    Oct. 25, 2012

(30) Foreign Application Priority Data

Oct. 30, 2009   (DE) .......................... 10 2009 046 202

(51) Int. Cl.
*F16K 31/02*     (2006.01)
*F16K 51/00*     (2006.01)
(Continued)

(52) U.S. Cl.
CPC ............... *B60T 8/3615* (2013.01); *B60T 8/363* (2013.01); *F16K 31/0655* (2013.01); *F16K 47/08* (2013.01)
USPC .......................... 251/153; 251/129.02; 138/44

(58) Field of Classification Search
CPC ... F16K 31/0655; F16K 31/0613; F16K 1/54; F16K 3/265; F16K 27/029; G01F 1/42; G01F 1/44; F16L 55/027; F16L 55/02754; F16L 55/02763; F16L 55/02781
USPC ........ 251/129.02, 153, 154, 129.15; 335/281, 335/297; 138/44
See application file for complete search history.

(56) References Cited

U.S. PATENT DOCUMENTS 1,049,845 A * 1/1913 Geissinger ...................... 251/80
1,567,043 A * 12/1925 De Boischevalier ............ 138/44
(Continued)

FOREIGN PATENT DOCUMENTS

DE          203 12 048 U1    1/2004
DE     10 2007 053 134 A1    5/2009
(Continued)

OTHER PUBLICATIONS

International Search Report corresponding to PCT Application No. PCT/EP2010/063085, mailed Oct. 15, 2010 (German and English language document) (8 pages).

*Primary Examiner* — John K Fristoe, Jr.
*Assistant Examiner* — Michael R Reid
(74) *Attorney, Agent, or Firm* — Maginot, Moore & Beck LLP

(57) ABSTRACT

A valve insert for a valve cartridge of a solenoid valve, wherein the valve insert is produced as a one-piece, slotted sleeve from a sheet metal strip and has at least one radial bore as an inlet and/or drain opening of a fluid flow and to a corresponding valve cartridge or to a solenoid valve having such a valve insert and to a method for producing a valve insert. The at least one radial bore is designed having a trumpet-shaped geometry in order to specifically influence the flow characteristics of the fluid flow.

9 Claims, 3 Drawing Sheets

(51) Int. Cl.
  *G01F 1/42* (2006.01)
  *B60T 8/36* (2006.01)
  *F16K 31/06* (2006.01)
  *F16K 47/08* (2006.01)

(56) References Cited

U.S. PATENT DOCUMENTS

| | | | | |
|---|---|---|---|---|
| 2,622,618 | A | * | 12/1952 | Ghormley .................. 251/30.03 |
| 3,776,278 | A | | 12/1973 | Allen |
| 6,024,129 | A | * | 2/2000 | Schima ........................... 138/44 |
| 2008/0191156 | A1 | * | 8/2008 | Shigeta et al. ........... 251/129.02 |
| 2009/0072174 | A1 | * | 3/2009 | Makino .................... 251/129.15 |
| 2010/0264342 | A1 | * | 10/2010 | Heyer et al. ............. 251/129.15 |

FOREIGN PATENT DOCUMENTS

| | | |
|---|---|---|
| EP | 2493734 A1 | 9/2012 |
| GB | 2 199 674 A | 7/1988 |
| JP | 2004 255615 A | 9/2004 |
| WO | 00/09917 A2 | 2/2000 |
| WO | 02/090806 A1 | 11/2002 |

\* cited by examiner

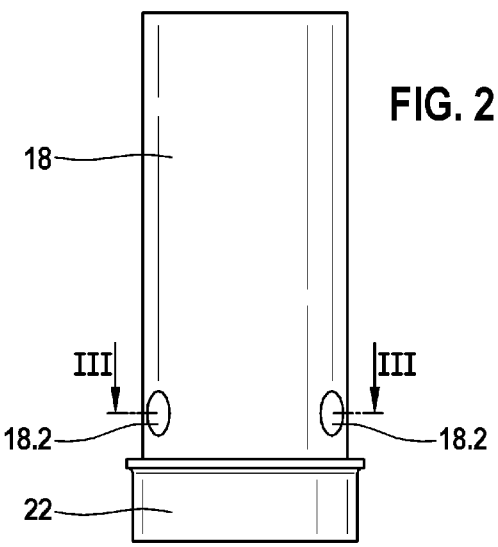
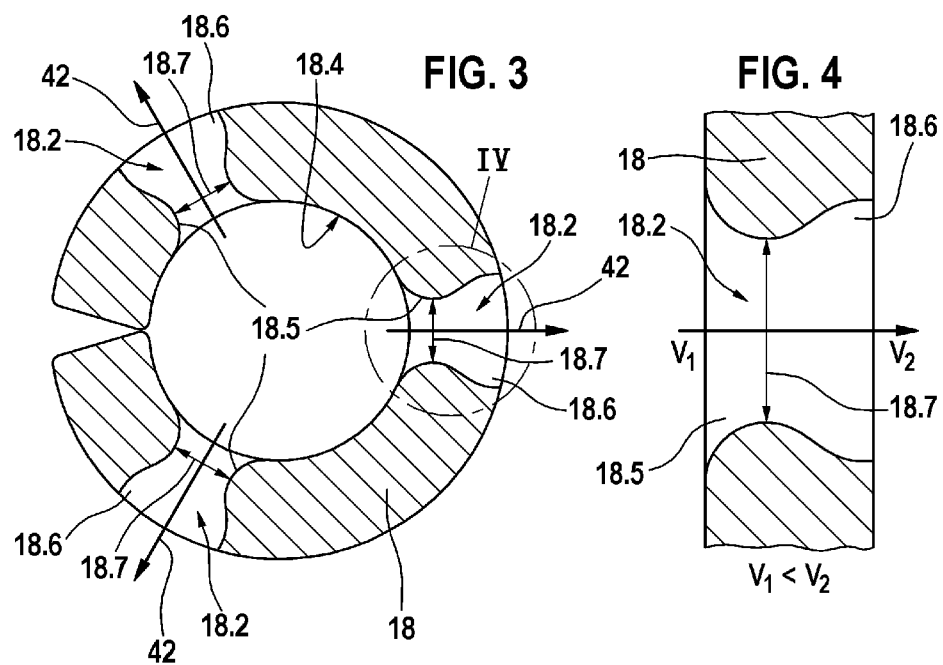

VALVE INSERT FOR A VALVE CARTRIDGE, CORRESPONDING VALVE CARTRIDGE FOR A SOLENOID VALVE, SOLENOID VALVE HAVING SAID VALVE CARTRIDGE AND METHOD FOR PRODUCING A VALVE INSERT

This application is a 35 U.S.C. §371 National Stage Application of PCT/EP2010/063085, filed on Sep. 7, 2010, which claims the benefit of priority to Serial No. DE 10 2009 046 202.3, filed on Oct. 30, 2009 in Germany, the disclosures of which are incorporated herein by reference in their entirety.

BACKGROUND

The disclosure relates to a valve insert for a valve cartridge, and to an associated valve cartridge for a solenoid valve, an associated solenoid valve and a method for producing a valve insert.

The prior art discloses solenoid valves, in particular for hydraulic units, which can be used, for example, in an anti-lock brake system (ABS) or a traction control system (TCS) or an electronic stability program system (ESP system). A solenoid valve as a technical component serves to monitor the inlet or outlet of gases or fluids or to perform open-loop or closed-loop control of the direction of flow.

German laid-open patent application DE 10 2007 053 134 A1 describes, for example, a valve cartridge for a solenoid valve and an associated solenoid valve having such a valve cartridge. The described valve cartridge comprises a capsule, a magnet armature which is movably guided within the capsule, a valve insert which is inserted by a first end into the capsule, and a valve body which is pressed into a second end of the valve insert and has a main valve seat. The magnet armature which is moved by a magnetic force which is generated moves a plunger which is guided within the valve insert and which has a closing element with a seal-forming element, wherein the seal-forming element dips in a seal-forming fashion into the main valve seat of the valve body in order to carry out a sealing function. In this context, the valve insert is embodied as a one-piece, slotted sleeve, and the valve body is embodied as a hood-shaped sleeve. The valve body which is embodied as a sleeve is therefore pressed into a second end of the valve insert which is embodied as a slotted sleeve, in such a way that the main valve seat is arranged within the valve insert. The valve insert which is embodied as a one-piece, slotted sleeve can be produced, for example, by rolling in a sheet metal strip, and the valve body can be produced, for example, as a hood-shaped deep-drawn part. In one refinement of the valve cartridge, a later shape of an inner bore of the valve insert can be formed in a corresponding surface of the sheet metal strip before the rolling-in process. This permits any desired favorable shapes to be formed for a volume-equalizing groove by simply processing the corresponding surface of the sheet metal strip before the rolling-in process. The valve insert of the solenoid valve has one or more radial bores which are embodied as inflow openings and outflow openings. These bores have the function of permitting a specific volume flow in an open valve state, depending on the configuration and working point of the solenoid valve. The size of the bore cross section is of essential importance for the throughflow rate.

SUMMARY

The valve seat according to the disclosure for a valve cartridge of a solenoid valve has, in contrast, the advantage that at least one inflow opening and/or outflow opening, embodied as a radial bore, of the valve insert for a fluid stream is embodied with a trumpet-shaped geometry, in order to selectively influence the flow characteristics of the fluid stream. In this context, the valve insert is produced as a one-piece, slotted sleeve from a sheet metal strip.

The valve insert according to the disclosure can be inserted into a valve cartridge or a solenoid valve in order to selectively influence the fluid flow characteristics in an advantageous way.

The method according to the disclosure for producing a valve insert for a valve cartridge of a solenoid valve has, in contrast, the advantage that at least one bore is formed in a sheet metal strip, and at least one edge region of the at least one bore is shaped by a stamping process and/or cutting process as a function of a desired flow characteristic in such a way that, after a shaping process of the sheet metal strip to produce the slotted sleeve, a trumpet-shaped geometry is formed for the at least one bore.

Embodiments of the disclosure permit the routing of the fluid flow or the fluid flow behavior to be selectively influenced by producing a radial bore in the valve insert with a trumpet-shaped geometry which has a similarity to the shape of a Laval nozzle. The trumpet-shaped geometry of the radial bore can be produced, for example, by punching, cutting out, drilling or perforating, with stamping and/or cutting of an edge chamfer or edge rounded portion of the corresponding radial bore and by the subsequent shaping of the sheet metal strip to form the slotted sleeve by bending or rolling or the like. These embodiments of the disclosure can advantageously improve the quality of the pressure modulation and the acoustics during the execution of the assigned functions. In the case of a hydraulic medium, the self-venting property of the corresponding solenoid valve can be improved, as a result of which vibrations and noises which are produced by outgassing of air/gas bubbles formed during the operation can be reduced or eliminated. Generally, in hydraulic and pneumatic solenoid valves, the routing of the fluid flow can be optimized and the acoustics of the solenoid valve can be improved by the inventive influencing of the flow resistance and the type of flow as well as by producing an increase in pressure upstream of the radial bore or a pressure drop downstream of the radial bore. In summary, the advantages of the disclosure are the improved venting property, the improved vibration behavior, the improved acoustics of the solenoid valve and an optimized solenoid valve function as a result of the trumpet-shaped geometry of the inflow openings and outflow openings which are embodied as radial bores.

The measures and developments which are specified in the dependent claims permit advantageous improvements of the valve insert specified in independent patent claim 1 and of the method for producing a valve insert which is specified in independent patent claim 7.

It is particularly advantageous that an effective cross section of the at least one radial bore is tapered in the direction of the fluid stream in an inflow region up to a constriction and is widened in an outflow region starting from the constriction. The shape of the radial bore influences the flow characteristics, with the result that the trumpet-shaped geometry of the radial bore which is embodied as an inflow opening or outflow opening is approximated geometrically to the shape of a Laval nozzle. Owing to the improved flow routing behavior, the valve acoustics can be influenced positively as a result of the changing of the flow speed within the trumpet-shaped geometry which is produced in the radial bore which is embodied as an inflow opening or outflow opening.

In one refinement of the valve insert according to the disclosure, a length of the inflow region up to the constriction is made shorter than the length of the outflow region starting from the constriction, in order to accelerate the fluid stream without severe compression shocks occurring. Alternatively, a length of the inflow region up to the constriction is made longer than the length of the outflow region starting from the constriction, in order to slow down the fluid stream. If the fluid flow is undesirably decelerated, the fluid flow can be braked by the compression shock and a decelerated pressure build-up or pressure drop can be achieved as a function of the application of the valve. By changing the flow speed within the radial bore which is embodied as an inflow opening or outflow opening it is possible to produce a partial vacuum in such a way that air bubbles and gas bubbles which are possibly formed in the solenoid valve are discharged from the solenoid valve through the radial bores owing to the resulting pressure difference.

In one refinement of the method according to the disclosure, the type and/or parameters for forming the at least one bore in the sheet metal strip are determined by a selected tool shape as a function of the trumpet-shaped geometry to be produced for the at least one bore. The at least one bore can be formed in the sheet metal strip by, for example, punching, perforating, cutting out or drilling, wherein, for example, a straight, oval, conical shape etc. can be predefined for the at least one bore through the geometry of the tool which is used.

In a further refinement of the method according to the disclosure, the type and/or parameters of the stamping process and/or cutting process are determined by a selected tool shape as a function of the trumpet-shaped geometry to be produced for the at least one bore. The stamping and/or cutting depth and/or the stamping and/or cutting shape can be predefined as a function of the configuration of the desired trumpet-shaped geometry of the at least one bore. It is therefore possible, for example, to provide a chamfer or a rounded portion on the bore edge regions by means of the stamping and/or cutting process. In this context, the sheet metal strip can be shaped both on one side and on both sides in the region of the bore, depending on the variant of the trumpet shape.

In a further refinement of the method according to the disclosure, the type and parameters of the shaping process to produce the slotted sleeve are determined by a selected tool shape as a function of the trumpet-shaped geometry to be produced for the at least one bore. The shaping of the sheet metal strip to produce the slotted sleeve can be generated, for example, by rolling or bending over or the like.

In summary, through corresponding tool shapes it is possible to selectively produce virtually any desired variations of the trumpet shape for the at least one radial bore in the valve insert in the solenoid valve in order to selectively influence the fluid flow.

The valve insert according to the disclosure with at least one trumpet-shaped radial bore can be used, for example, in solenoid valves which are open or closed in the de-energized state.

BRIEF DESCRIPTION OF THE DRAWINGS

Advantageous embodiments of the disclosure are illustrated in the drawings and are described below. In the drawings, identical reference symbols denote components and/or elements which carry out identical or analogous functions.

FIG. 2 shows a schematic perspective illustration of a valve insert according to the disclosure for the valve cartridge according to FIG. 1.

FIG. 3 shows a schematic cross-sectional illustration of the valve insert according to FIG. 2.

FIG. 4 shows a schematic illustration of a detail from FIG. 3.

DETAILED DESCRIPTION

Figure 1:
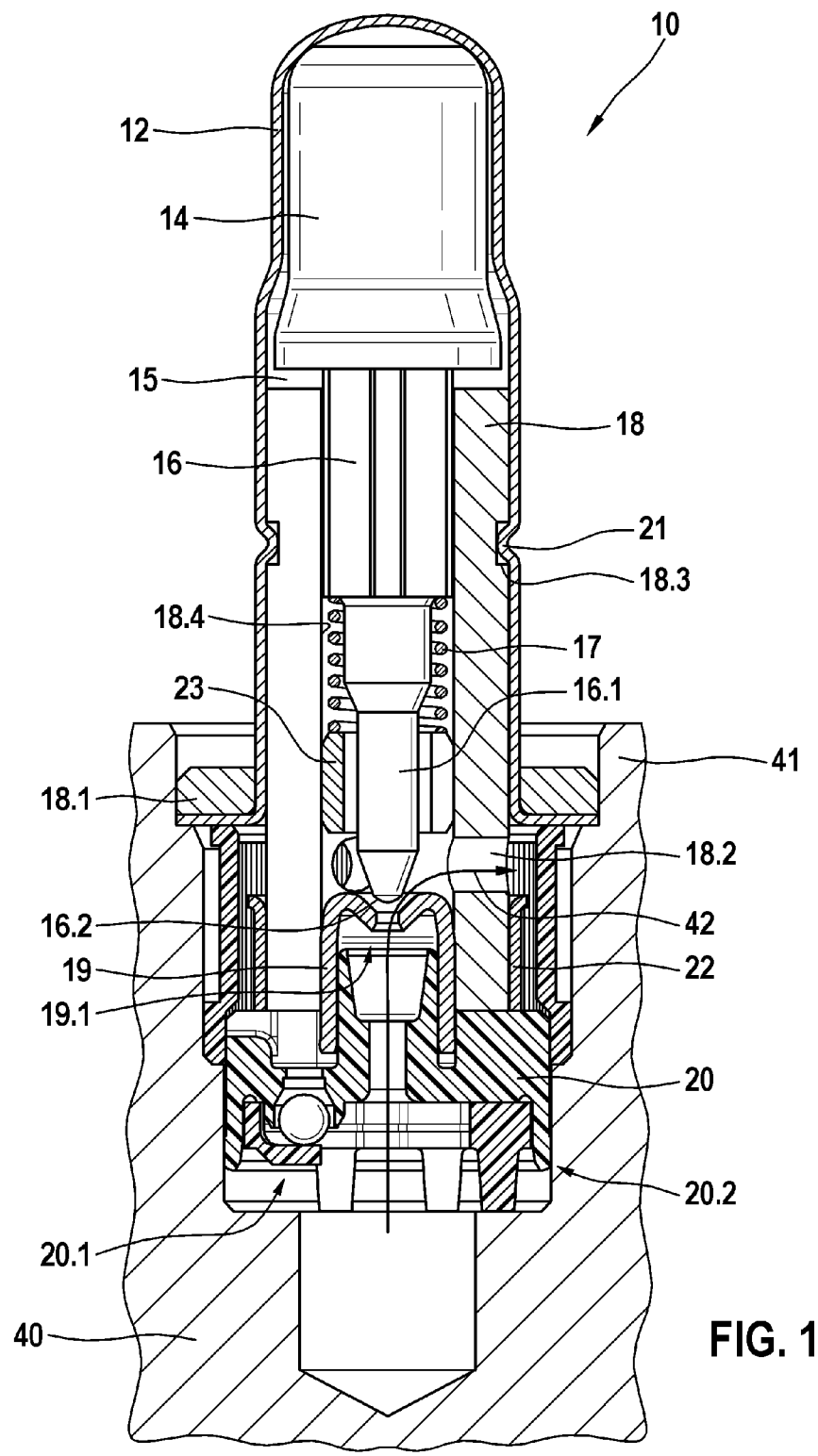
FIG. 1 shows a schematic sectional illustration of an exemplary embodiment of a valve cartridge according to the disclosure for a solenoid valve.

As is apparent from FIG. 1, an exemplary embodiment of a valve cartridge 10 according to the disclosure for a solenoid valve comprises a capsule 12, a magnet armature 14 which is movably guided within the capsule 12, a valve insert 18 according to the disclosure, which is inserted by a first end into the capsule 12 and is subsequently described below in detail with reference to FIGS. 2 to 4, and a valve body 19 with a main valve seat 19.1. A plunger 16 is movably guided longitudinally within the valve insert 18, which plunger has a closing element 16.1 with a sealing element 16.2 which dips into the main valve seat 19.1 of the valve body 19 in a seal-forming fashion in order to carry out a sealing function. The plunger 16 can be moved within the valve insert 18 by the magnet armature 14 counter to the force of a restoring spring 17, wherein the magnet armature 14 is moved by a magnet force which is produced by a magnet assembly (not illustrated).

As is also apparent from FIG. 1, the capsule 12 is embodied as a valve component which forms a seal with respect to the atmosphere and is lengthened in the direction of the caulked region 41 with a fluid block 40. For this reason, the caulking forces are not taken up by the valve insert 18 but rather by a caulking bush 18.1. In the illustrated exemplary embodiment of the valve cartridge according to the disclosure, a maximum stroke of the plunger 16 can be set by axial displacement of the valve insert 18 within the capsule 12. A minimum air gap 15 between the magnet armature 14 and the valve insert 18 can be set by axial displacement of the valve body 19 within the valve insert 18 with an inserted armature 14. The air gap 15 which is set can be defined by a crimped connection 21 between the capsule 12 and the valve insert 18, wherein the valve insert 18 can be implemented with a circumferential groove 18.3 in order to produce the crimped connection 21. As a result, the crimped connection 21 ensures that the working air gap 15 is maintained, wherein in addition the hydraulically acting forces can be absorbed. The restoring spring 17 for the plunger 16 is arranged outside the flow region, wherein the restoring spring 17 is supported on a spring support 23 which is embodied in the illustrated exemplary embodiment as a clamping sleeve which is introduced into the valve insert 18. Positioning the restoring spring 17 out of the installation space through which there is a flow allows the wear on the plunger 16 to be reduced and the throughflow between the main valve seat 19.1 and corresponding radial bores 18.2 formed in the valve insert 18 to be increased.

As is also apparent from FIG. 1, the valve body 19 is embodied as a hood-shaped sleeve. The valve body 19 which is embodied as a sleeve is embodied, for example, as a deep-drawn part and is pressed via a press-in region into a second end of the valve insert 18 embodied as a slotted sleeve in such a way that the main valve seat 19.1 is arranged within the valve insert 18. The main valve seat 19.1 in the valve body 19 is decoupled from the press-in region by means of a decoupling region, in order to prevent the main valve seat 19.1 from being deformed by the process of pressing the valve body 19 into the valve insert 18. The hydraulic forces are absorbed by the valve insert 18 which is implemented as a slotted sleeve. In order to prevent the valve insert 18 from being widened by the pressing in of the valve body 19, in the illustrated exemplary embodiment a reinforcement ring 22 is pressed onto the second end of the valve insert 18. The pressed-on reinforcement ring 22 advantageously enlarges the freedom of configuration of the valve insert 18 when the valve body 19 is pressed in. In an alternative embodiment (not illustrated) of the valve cartridge 10 according to the disclosure, the joints of the valve insert 18 which is embodied as a slotted sleeve are connected to one another at least at the second end of the valve insert 18, in order to increase the freedom of configuration of the valve insert 18 when the valve body 19 is pressed in. The joints of the valve insert 18 which is embodied as a slotted sleeve can be connected to one another, for example, by welding and/or bonding and/or interlocking.

As is also apparent from FIG. 1, a valve lower part 20 which is embodied as a plastic insert is positioned and supported axially on the valve insert 18, wherein the valve lower part 20 is inserted in a seal-forming fashion into an interior space of the valve body 19 via a dome and is sealed with the outer contour with respect to the surrounding fluid block 40. In addition, the illustrated valve lower part 20 comprises an eccentrically arranged non-return valve 20.1 which carries out a direction-oriented through-flow function. In addition, the valve lower part 20 accommodates a flat filter 20.2.

As is apparent from FIGS. 1 to 4, the valve insert 18 is embodied as a one-piece slotted sleeve which comprises three radial bores 18.2 which are arranged symmetrically along the circumference and located transversely with respect to the valve insert 18, as outflow openings and the inner bore 18.4 as an inflow opening. The radial bores 18.2 have the function that, in an opened valve state, they permit a specific fluid volume flow 42 to pass through as a function of the configuration and the working point of the solenoid valve. In the illustrated exemplary embodiment, the inner bore 18.4 of the valve insert 18 has a virtually perfect or very closely approximated circular shape in which the plunger 16 is guided. In the opened solenoid valve state, the fluid flow 42 flows through the main valve seat 19.1 and the outflow openings which are embodied as radial bores 18.2. In this context, the shape of the radial bores 18.2 influences the flow characteristics. According to the invention, the radial bores 18.2 are each formed with a trumpet-shaped geometry, in order to selectively influence the flow characteristics of the fluid stream 42.

As is also apparent from FIGS. 3 and 4, an effective cross section of the respective radial bore 18.2 tapers in the direction of the fluid stream 42 in an inflow region 18.5 to a constriction 18.7, and widens in an outflow region 18.6 starting from a constriction 18.7. Since the length of the inflow region 18.5 up to the constriction 18.7 is made shorter than the length of the outflow region 18.6 starting from the constriction 18.7, the fluid stream 42 accelerates from a low first speed $V_1$ to a relatively high second speed $V_2$. In order to slow down the fluid stream 42, it is possible, in an alternative embodiment (not illustrated), to make the length of the inflow region up to the constriction longer than the length of the outflow region starting from the constriction, as a result of which the flow through the compression joint is slowed down and a delayed pressure build-up or pressure drop can be achieved as a function of the application of the valve.

The trumpet-shaped geometry permits the radial bores 18.2 to be approximated to the shape of a Laval nozzle. The fluid flow can therefore be accelerated or slowed down without severe compression shocks occurring.

As a result of the changing of the flow speed within the radial bores 18.2, a partial vacuum can be produced so that air bubbles or gas bubbles which are possibly formed within the solenoid valve are discharged from the valve through the radial bores 18.2 due to the resulting pressure difference. Owing to the improved flow routing behavior, the valve acoustics can be influenced positively as a result of the changing of the flow speed within the produced trumpet shape in the radial bores 18.2. Embodiments of the valve insert 18 according to the disclosure permit the vibrations and noises which are produced as a result of the possible outgassing of the air bubbles/gas bubbles formed during operation to be reduced and/or eliminated and improve the self-venting property of a hydraulic solenoid valve. In addition, the routing of the fluid flow can be optimized and the solenoid valve acoustics can be improved by a corresponding embodiment of the trumpet-shaped geometry of the individual radial bores 18.2 in hydraulic and/or pneumatic solenoid valves by, for example, influencing the flow resistance or the type of flow (laminar/turbulent) or by a fluid compression shock in order to increase the pressure upstream of the radial bore 18.2 or by fluid expansion (Laval nozzle principle) in order to produce a pressure drop downstream of the radial bore 18.2.

The valve insert 18 which is embodied as a one-piece, slotted sleeve can be produced, for example, by rolling in a sheet metal strip 18', as is described below with reference to FIGS. 5 to 7. In order to equalize the volume which the plunger 16 expels in the case of its axial movement brought about by the magnetic flux induced by the magnet assembly, and in order to bring about venting and/or ventilation, at least one axially extending volume-equalizing groove is formed in the plunger 16. However, alternatively the at least one volume-equalizing groove can also be formed in the inner bore of the valve insert 18.

Figure 5:
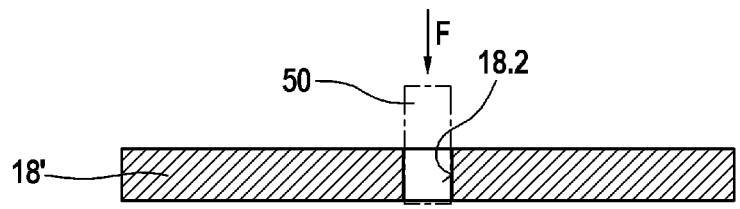
FIGS. 5 to 7 show various stages of an exemplary embodiment of a method for manufacturing the valve insert according to FIGS. 1 to 4 for the valve cartridge according to FIG. 1.
Figure 6:
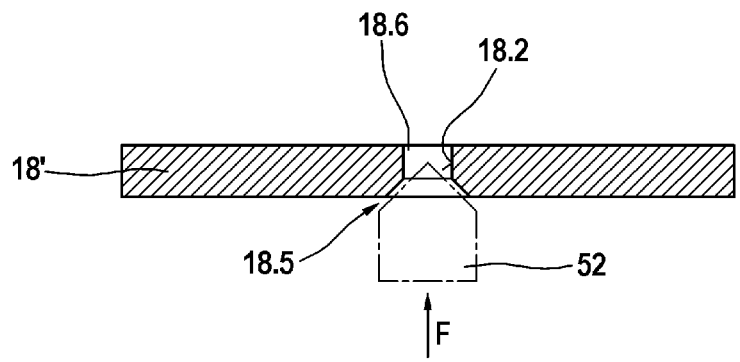
Figure 7:
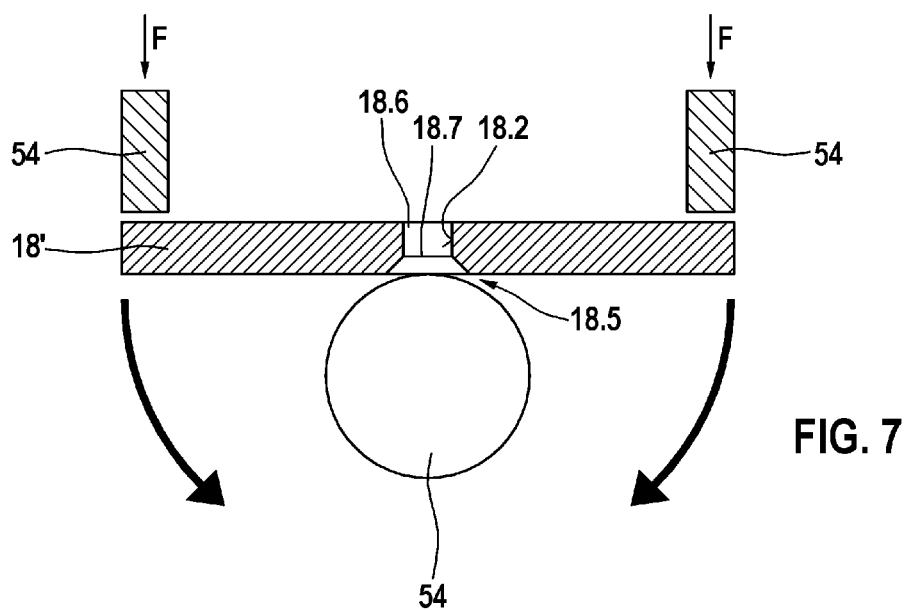

As is apparent from FIGS. 5 to 7, at least one bore 18.2 is formed in a sheet metal strip 18' with a corresponding drilling tool 50 in order to produce the valve insert 18 according to the disclosure. The at least one bore 18.2 can be formed, for example, by punching, perforating, cutting out or drilling into the sheet metal strip 18'. After the formation of the at least one bore 18.2, at least one end region of the at least one bore 18.2 is shaped by a stamping and/or cutting process with a corresponding stamping and/or cutting tool 52 as a function of the desired flow characteristics of the at least one bore 18.2 in order to form an inflow region 18.5 and/or an outflow region 18.6. For example, a chamfer or a rounded portion with a predefined depth can be produced on the bore edges in order to form the inflow region 18.5 and/or the outflow region 18.6 by means of the stamping process and/or cutting process. The sheet metal strip 18' can be shaped either on one side or on both sides in the region of the at least one bore 18.2 as a function of the desired trumpet-shaped geometry of the at least one bore 18.2. Subsequently, the sheet metal strip 18' is shaped by a shaping process to form the one-piece, slotted sleeve 18 which has at least one radial bore 18.2 with a trumpet-shaped geometry. The shaping process can be carried out by means of corresponding tools 54, for example by bending or rolling the sheet metal strip 18'.

The straight, oval or conical shape of the tool for forming the at least one bore 18.2 in the sheet metal strip 18' permits, by virtue of the shape and depth of the stamping and/or cutting as well as through the type and parameters of the shaping method, virtually any desired variations of the trumpet shape of the at least one radial bore 18.2 to be selectively produced on the valve insert 18 of the valve cartridge 10 of the solenoid valve.

Embodiments of the disclosure advantageously permit selective influencing of the routing of the fluid flow and/or of the fluid flow behavior through the formation of a radial bore in the valve insert in the form of a "trumpet" by punching, cutting out, drilling or perforating, by means of the stamping and/or cutting of an edge chamfer or edge rounded portion and by means of the subsequent shaping by bending or rolling the sheet metal strip. The advantages of the disclosure are the improved venting property, the improved oscillation behavior, the improved acoustics of the solenoid valve as well as optimized solenoid valve function through the inventive trumpet-shaped geometry of the radial bores.

The invention claimed is:

1. A valve insert for a valve cartridge of a solenoid valve comprising:
    a one-piece, slotted sleeve formed from a sheet metal strip, the slotted sleeve defining at least one radial bore configured to provide an inlet opening and/or discharge opening of a fluid stream,
    wherein the at least one radial bore has a trumpet-shaped geometry configured to selectively influence the flow characteristics of the fluid stream, and
    wherein the trumpet-shaped geometry results in the radial bore having a continuous curved shape in a cross-section taken along a plane that is parallel to a direction of fluid flow within the radial bore.

2. The valve insert as claimed in claim 1, wherein an effective cross section of the at least one radial bore is tapered in the direction of the fluid stream in an inflow region up to a constriction and is widened in an outflow region starting from the constriction.

3. The valve insert as claimed in claim 2, wherein a length of the inflow region up to the constriction is shorter than a length of the outflow region starting from the constriction to accelerate the fluid stream.

4. The valve insert as claimed in claim 2, wherein a length of the inflow region up to the constriction is longer than a length of the outflow region starting from the constriction to slow the fluid stream.

5. A valve cartridge for a solenoid valve comprising:
    a capsule,
    a magnet armature which is movably guided within the capsule,
    a valve insert which is inserted into the capsule by a first end, the valve insert including a one-piece, slotted sleeve that defines at least one radial bore, the at least one radial bore being configured to provide an inflow opening and/or outflow opening of a fluid stream, and
    a valve body with a main valve seat,
    wherein the magnet armature which is moved by a generated magnetic force moves a plunger which is guided within the valve insert and which has a closing element with a sealing element,
    wherein the sealing element dips in a seal-forming fashion into the main valve seat of the valve body in order to carry out a sealing function, and
    wherein the at least one radial bore has a trumpet-shaped geometry configured to selectively influence the flow characteristics of the fluid stream,
    wherein the trumpet-shaped geometry results in the radial bore having a continuous curved shape in a cross-section taken along a plane that is parallel to a direction of fluid flow within the radial bore.

6. A method for producing a valve insert for a valve cartridge of a solenoid valve comprising:
    forming at least one bore in a sheet metal strip, and
    shaping the sheet metal strip to form a one-piece, slotted sleeve,
    wherein at least one edge region of the at least one bore is shaped by a stamping and/or cutting process as a function of a desired flow characteristic to form the at least one bore with a trumpet-shaped geometry after the slotted sleeve is shaped,
    wherein the trumpet-shaped geometry results in the radial bore having a continuous curved shape in a cross-section taken along a plane that is parallel to a direction of fluid flow within the radial bore.

7. The method as claimed in claim 6, wherein a type and/or parameters of a process for forming the at least one bore in the sheet metal strip depend on the trumpet-shaped geometry to be produced for the at least one bore.

8. The method as claimed in claim 6, wherein a type and/or parameters of the stamping process and/or cutting process used to shape the at least one edge region of the at least one bore depend on the trumpet-shaped geometry to be produced for the at least one bore.

9. The method as claimed in claim 6, wherein a type and parameters of the shaping process to produce the slotted sleeve depend on the trumpet-shaped geometry to be produced for the at least one bore.

* * * * *